(12) United States Patent
Lee et al.

(10) Patent No.: US 11,646,448 B2
(45) Date of Patent: May 9, 2023

(54) ELECTROLYTE FOR LITHIUM SECONDARY BATTERY AND LITHIUM SECONDARY BATTERY COMPRISING SAME

(71) Applicants: HYUNDAI MOTOR COMPANY, Seoul (KR); KIA CORPORATION, Seoul (KR); UNIST (ULSAN NATIONAL INSTITUTE OF SCIENCE AND TECHNOLOGY), Ulsan (KR)

(72) Inventors: Yoon Sung Lee, Suwon-si (KR); Seung Min Oh, Incheon (KR); Ji Eun Lee, Hwaseong-si (KR); Sung Ho Ban, Hwaseong-si (KR); Ik Kyu Kim, Gwangmyeong-si (KR); Ko Eun Kim, Cheongju-si (KR); Sang Kyu Kwak, Ulsan (KR); Nam Soon Choi, Ulsan (KR); Woo Gyum Kim, Ulsan (KR); Hyeon Gyu Moon, Ulsan (KR); Sung You Hong, Ulsan (KR); Dae Yeon Hwang, Ulsan (KR)

(73) Assignees: Hyundai Motor Company, Seoul (KR); Kia Corporation, Seoul (KR); UNIST (Ulsan National Insitute of Science and Technology), Ulsan (KR)

(*) Notice: Subject to any disclaimer, the term of this patent is extended or adjusted under 35 U.S.C. 154(b) by 107 days.

(21) Appl. No.: 17/340,718

(22) Filed: Jun. 7, 2021

(65) Prior Publication Data
US 2022/0115697 A1  Apr. 14, 2022

(30) Foreign Application Priority Data
Oct. 13, 2020 (KR) .................. 10-2020-0132094

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/386* (2013.01); *H01M 4/583* (2013.01);
(Continued)

(58) Field of Classification Search
CPC .. H01M 4/386; H01M 10/0567; H01M 4/583; H01M 10/0525; H01M 10/0569;
(Continued)

(56) References Cited

U.S. PATENT DOCUMENTS

| 2008/0160418 A1* | 7/2008 | Pan ................ H01M 10/0525 429/339 |
| 2009/0325065 A1* | 12/2009 | Fujii ............... H01M 10/0569 429/207 |

(Continued)

FOREIGN PATENT DOCUMENTS

| DE | 102012022969 | * 5/2014 |
| KR | 10-2019-0092149 | 8/2019 |
| WO | WO 2016063964 | * 4/2016 |

OTHER PUBLICATIONS

DE 102012022969 MT (Year: 2014).*

*Primary Examiner* — Alexander Usyatinsky
(74) *Attorney, Agent, or Firm* — Fox Rothschild LLP

(57) ABSTRACT

The electrolyte for a lithium secondary battery includes: a lithium salt; a solvent; and a functional additive, wherein the functional additive includes 1,2-bis(maleimido)ethane, represented by the following formula 1:

(Continued)

[Formula 1]

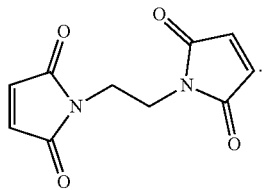

5 Claims, 3 Drawing Sheets

Figure 1:
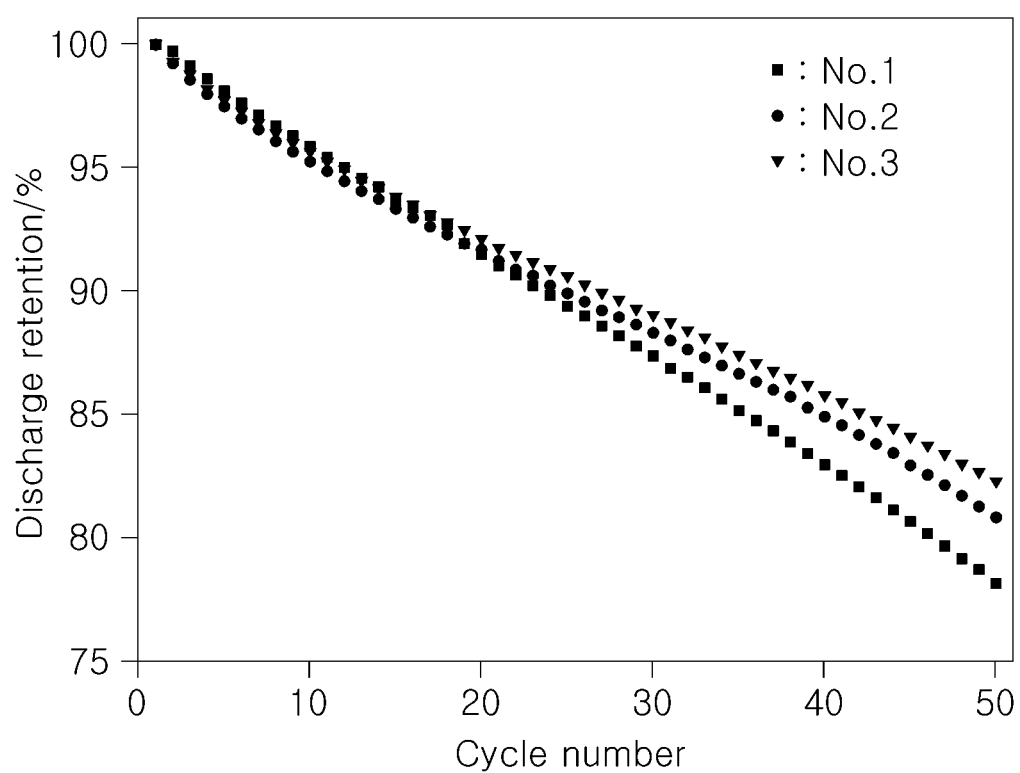

(51) Int. Cl.
 H01M 4/583 (2010.01)
 H01M 10/0569 (2010.01)
 H01M 4/38 (2006.01)
 H01M 4/02 (2006.01)

(52) U.S. Cl.
 CPC ... H01M 10/0525 (2013.01); H01M 10/0569 (2013.01); *H01M 2004/027* (2013.01); *H01M 2004/028* (2013.01); *H01M 2300/0028* (2013.01); *H01M 2300/0051* (2013.01); *H01M 2300/0054* (2013.01)

(58) Field of Classification Search
 CPC ... H01M 2004/027; H01M 2300/0028; H01M 2300/0051; H01M 2300/0054
 See application file for complete search history.

(56) References Cited

U.S. PATENT DOCUMENTS

| | | | |
|---|---|---|---|
| 2012/0171579 A1* | 7/2012 | Tsai | H01M 4/5815 429/207 |
| 2015/0180087 A1* | 6/2015 | Kim | H01M 10/0567 429/200 |
| 2016/0079627 A1* | 3/2016 | Kim | H01M 10/0567 429/188 |
| 2016/0079628 A1* | 3/2016 | Kim | H01M 10/052 429/188 |
| 2017/0125809 A1* | 5/2017 | Kim | C01G 53/00 |

* cited by examiner

ELECTROLYTE FOR LITHIUM SECONDARY BATTERY AND LITHIUM SECONDARY BATTERY COMPRISING SAME

CROSS REFERENCE TO RELATED APPLICATION

The present application claims priority to and the benefit of Korean Patent Application No. 10-2020-0132094, filed on Oct. 13, 2020, the entire contents of which are incorporated herein by reference.

FIELD

The present disclosure relates to an electrolyte for a lithium secondary battery and a lithium secondary battery comprising the same.

BACKGROUND

The statements in this section merely provide background information related to the present disclosure and may not constitute prior art.

A lithium secondary battery is an energy storage system comprising a positive electrode for supplying lithium ions on charge, a negative electrode for receiving lithium ions, an electrolyte serving as a lithium ion transmission mediator, and a separator for separating the positive electrode and the negative electrode, wherein electric energy is generated and stored as chemical potentials change with intercalation/deintercalation in the positive and the negative electrode.

Such lithium secondary batteries have been used mainly in mobile electronic devices and are now rapidly expanding their use as an energy storage system to electric vehicles (EVs) and hybrid electric vehicles (HEVs) that have been successfully commercialized therewith.

In order to increase driving ranges of EVs, studies have been focused on the increase of energy density in lithium secondary batteries. An improvement of high capacity in the positive electrode makes it possible to increase an energy density in a lithium secondary battery.

Particularly, energy density in a battery depends greatly on characteristics of the positive and the negative electrode. Accordingly, we have discovered that a suitable electrolyte allowing positive and negative electrodes to exhibit excellent electrochemical performance is desired.

The description given in the related art is only to understand the background of the present disclosure, but should not be recognized as a prior art already known to a person skilled in the art.

SUMMARY

The present disclosure provides an electrolyte for a lithium secondary battery, which can improve lifetime characteristics in a lithium secondary battery, and a lithium secondary battery comprising the same.

An electrolyte for a lithium secondary battery according to one form of the present disclosure comprises a lithium salt, a solvent, and a functional additive, wherein the functional additive comprises 1,2-bis(maleimido)ethane, represented by the following formula 1:

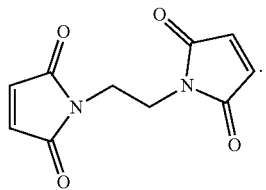

[Formula 1]

The 1,2-bis((maleimido)ethane may be used in a total amount of 0.5-2.0 wt %, based on a total weight of the electrolyte.

The functional additive may be further comprised of fluoroethylene carbonate (FEC).

The fluoroethylene carbonate (FEC) may be added in an amount of 0.5-3.0 wt %, based on a total weight of the electrolyte.

The lithium salt may be at least one compound selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

The solvent may be at least one substance selected from the group consisting of a carbonate-based solvent, an ester-based solvent, and a ketone-based solvent.

A lithium secondary battery according to one form of the present disclosure comprises the electrolyte described above. The lithium secondary battery may further comprise a positive electrode containing a positive electrode active material composed of Ni, Co, or Mn; a negative electrode containing at least one negative electrode active material selected from a carbon (C)-based material and silicon (Si)-based material; and a separator interposed between the positive electrode and the negative electrode.

The positive electrode may contain Ni at a content of 80 wt % or more.

Further areas of applicability will become apparent from the description provided herein. It should be understood that the description and specific examples are intended for purposes of illustration only and are not intended to limit the scope of the present disclosure.

DRAWINGS

Figure 2:
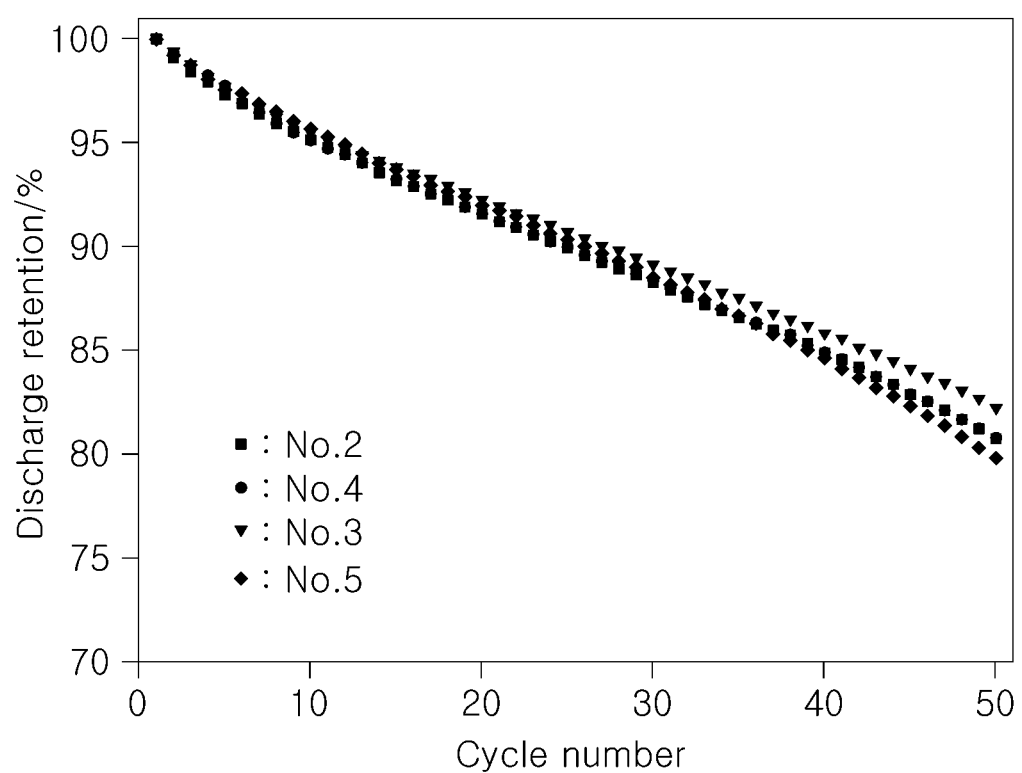
Figure 3:
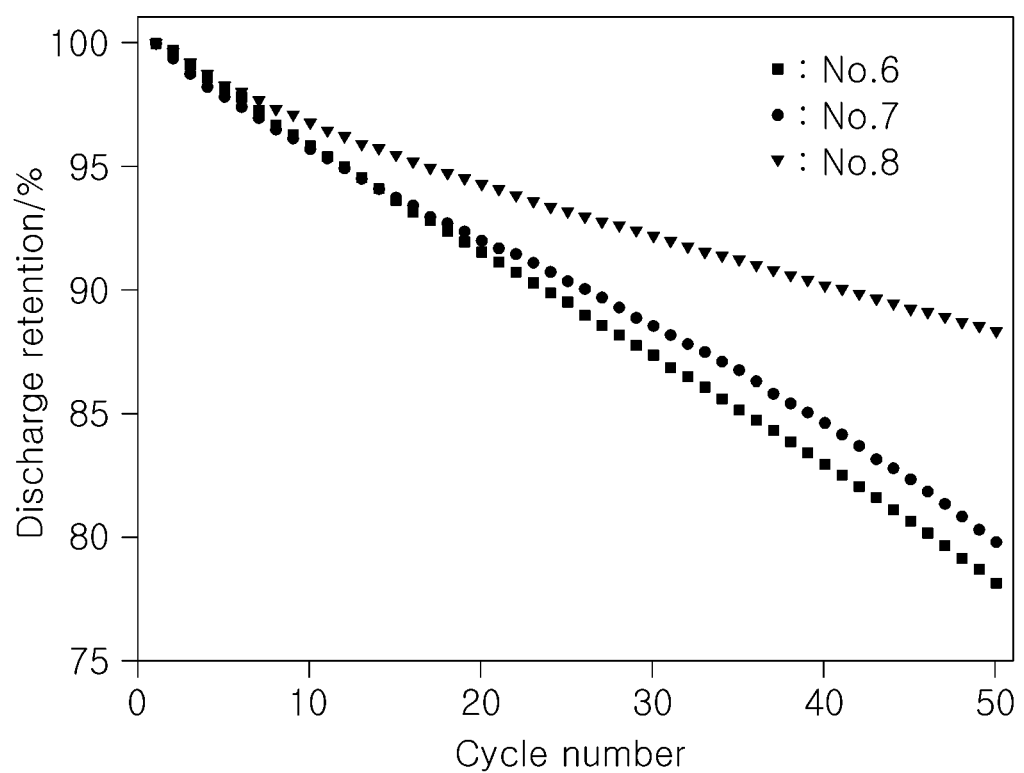

In order that the disclosure may be well understood, there will now be described various forms thereof, given by way of example, reference being made to the accompanying drawings, in which:

FIGS. 1 to 3 are graphs showing results of charge/discharge tests in the Example and the Comparative Example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An electrolyte for a lithium secondary battery according to oen form of the present disclosure comprises a lithium salt, a solvent, and a functional additive.

The lithium salt may be at least one compound selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

The lithium salt may exist at a total concentration of 0.1-1.2 moles in the electrolyte.

The solvent may be at least one substance selected from the group consisting of a carbonate-based solvent, an ester-based solvent, an ether-based solvent, and a ketone-based solvent.

In this regard, examples of the carbonate-based solvent include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), and vinylene carbonate (VC). The ester-based solvent may be exemplified by γ-butyrolactone (GBL), n-methyl acetate, n-ethyl acetate, n-propyl acetate, etc. As the ether-based solvent, dibutyl ether may be used, but without limitations thereto.

In addition, the solvent may further comprise an aromatic hydrocarbonate solvent. Examples of the aromatic carbohydrate solvent include benzene, fluorobenzene, bromobenzene, chlorobenzene, cyclohexyl benzene, isopropyl benzene, n-butylbenzene, octyl benzene, toluene, xylene, and mesitylene, which may be used alone or in combination.

The functional additive used in the electrolyte according to one form of the present disclosure may employ 1,2-bis (maleimido)ethane as a first negative electrode film additive (Bis(II)), represented by the following formula 1:

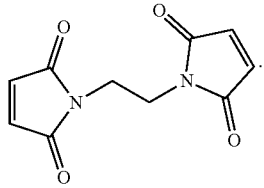

[Formula 1]

In this regard, 1,2-bis(maleimido)ethane, which serves as the first negative electrode film additive (Bis(II)), stabilizes the negative electrode by forming SEI on the surface of the negative electrode material, and may be preferably added in an amount of 0.5-1.0 wt %, based on the total weight of the electrolyte.

When added in an amount less than 0.5 wt %, the first negative electrode film additive (Bis(II)) contributes only little effect because it cannot sufficiently form a surface SEI on the surface of the negative electrode active material. More than 2.0 wt % of the first negative electrode film additive causes the excessive formation of SEI, increasing a cell resistance, which results in a decreased lifetime.

Meanwhile, the functional additive may further comprise a second negative electrode film additive functioning to form a film on a negative electrode in addition to the first negative electrode film additive. For example, fluoroethylene carbonate (hereinafter referred to "FEC") may be used as the second negative electrode film additive.

The second negative electrode film additive may be preferably added in an amount of 0.5-3.0 wt %, based on the weight of the electrolyte. More preferably, the second negative electrode film additive may be added in an amount of 1.5-2.5 wt %.

Less than 0.5 wt % of the second negative electrode film additive reduces long-term lifetime characteristics of the cell. When the amount of the second negative electrode film additive exceeds 3.0 wt %, excessively formed surface protecting layer causes increased cell resistance, resulting in a reduction in battery output.

According to one form of the present disclosure, a lithium secondary battery comprises the electrolyte described above, a positive electrode, a negative electrode, and a separator.

The positive electrode includes an NCM-based positive electrode active material composed of Ni, Co, and Mn. Particularly, the positive electrode active material in the positive electrode according to one form is composed only of an NCM-based positive electrode active material containing 80 wt % or more of Ni. By way of example, NCM811 may be used for the positive electrode.

The negative electrode includes at least one negative electrode active material selected from carbon (C)- and silicon (Si)-based negative electrode active materials.

The carbon (C)-based negative electrode active material may be at least one selected from the group consisting of artificial graphite, natural graphite, graphitized carbon fibers, graphitized mesocarbon microbeads, fullerene, and amorphous carbon.

The silicon (Si)-based negative electrode active material may include a silicon oxide, a silicon particle, and a silicon alloy particle.

For the positive electrode and the negative electrode, the corresponding active material is mixed with a conductive material, a binder, and a solvent to prepare an electrode slurry. This electrode slurry is applied directly on a current collector and is dried to manufacture the positive electrode or the negative electrode. In this regard, the current collector may be formed of aluminum (Al), but with no limitations thereto. Such electrode manufacturing methods are well known in the art and thus a detailed description is omitted herein.

The binder acts to well aggregate active material particles to each other or strongly attach them to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-bearing polymers, polyvinyl pyrrolidone, polyurethane, polytetrafluoroethylene, polyvinylidene fluoride, polyethylene, polypropylene, styrene butadiene rubber, acrylated styrene butadiene rubber, an epoxy resin, and nylon.

The conductive material is used to confer conductivity on the electrodes. So long as it is of electron conductivity without causing a chemical change in the battery, any conductive material is available. Examples of the conductive material include natural graphite, artificial graphite, carbon black, acetylene black, Ketjenblack, carbon fibers, and metal particles or fibers such as copper, nickel, aluminum, silver, etc. In addition, at least one conductive material such as a polyphenylene derivative may be further used.

The separator inhibits the formation of a short circuit between the positive electrode and the negative electrode while providing migration channels of lithium ions. This separator may be a well-known one including, for example, a polyolefinic membrane such as polypropylene, polyethylene, polyethylene/polypropylene, polyethylene/polypropylene/polyethylene, polypropylene/polyethylene/polypropylene, etc., or a multiple membrane, microporous film, woven fabric, or non-woven fabric thereof. Alternatively, a porous polyolefin film coated with highly stable resin may be used.

Hereinafter, the present disclosure is explained with reference to Examples and Comparative Examples.

<Experiment 1> Test for Cell Resistance and High-Temperature Lifetime Characteristic at High Temperature (45° C.) According to Type of Functional Additive.

To examine cell resistance and high-temperature lifetime characteristics according to types of functional additives used in an electrolyte, a measurement was made of initial cell resistance and discharge retention after 50 cycles at a high temperature (45° C.) while types of functional additives were changed as shown in Table 1, below. The results are summarized in Table 1 and depicted in FIG. 1.

In this regard, the cycles were performed under the conditions of cut-off: 2.7-4.35V, C-rate 0.5 C, and temperature: 45° C. For preparing electrolytes, 0.5M $LiPF_6$+0.5 LiFSI was used as a lithium salt and a mixture of ethylene carbonate (EC):ethylmethyl carbonate (EMC):diethyl carbonate (DEC) at a volume ratio of 25:45:30 was used.

The positive electrode was made of NCM811 while the negative electrode was a graphite electrode.

TABLE 1

| No. | Additive | | | Initial cell resistance (%) | High temp. lifetime (%) @50 cyc |
|---|---|---|---|---|---|
| | VC | FEC | Bis (II) | | |
| 1 | Comparative Example | — | — | — | 100 | 78.2 |
| 2 | Comparative Example | 1.0 | — | — | 105.4 | 80.8 |
| 3 | Example | — | — | 1.0 | 106.3 | 82.3 |

Example

As can be understood from data of Table 1 and FIG. 1, high-temperature lifetime was improved in Nos. 2 and 3 where the typical functional additive VC and the first negative electrode film additive (Bis(II)) according to the present disclosure were added, respectively, compared to No. 1 to which no additives were added, particularly with a better improvement of high-temperature in No. 3 than in No. 2.

Therefore, the use of the first negative electrode film additive 1,2-bis((maleimido)ethane (Bis(II)) in an electrolyte was observed to contribute to an improvement in high-temperature lifetime.

<Experiment 2> Test for Cell Resistance and High-Temperature Lifetime Characteristic at High Temperature (45° C.) According to Amount of Functional Additive.

a measurement was made of initial cell resistance and discharge retention after 50 cycles at a high temperature (45° C.) in the same manner as in Experiment 1 with the exception that amounts of the functional additives were changed as shown in Table 2, below. The results are summarized in Table 2 and depicted in FIG. 2.

TABLE 2

| No. | Additive | | | Initial cell resistance (%) | High temp. lifetime (%) @50 cyc |
|---|---|---|---|---|---|
| | VC | FEC | Bis (II) | | |
| 2 | Comparative Example | 1.0 | — | — | 105.4 | 80.8 |
| 4 | Example | — | — | 0.5 | 105.9 | 80.8 |

TABLE 2-continued

| No. | Additive | | | Initial cell resistance (%) | High temp. lifetime (%) @50 cyc |
|---|---|---|---|---|---|
| | VC | FEC | Bis (II) | | |
| 3 | Example | — | — | 1.0 | 106.3 | 82.3 |
| 5 | Example | — | — | 2.0 | 109.1 | 79.8 |

As can be seen in Table 2 and FIG. 2, high-temperature lifetime was further improved in No. 3 where the first negative electrode film additive (Bis(II)) according to the present disclosure was used in an amount of 1.0 wt %, compared to No. 2 wherein the typical functional additive VC was used in the same amount.

All of Nos. 4, 3, and 5 where the first negative electrode film additive (Bis(II)) was used in amounts of 0.5 wt %, 1.0 wt %, and 2.0 wt %, respectively, exhibited higher high-temperature lifetimes than No. 1 where no additives were used in Experiment 1.

In terms of high-temperature lifetime characteristics, the first negative film additive (Bis(II)) was found to exhibit a better effect than the typical functional additive VC. In addition, the high-temperature lifetime was further improved when the first negative electrode film additive (Bis(II)) was added in an amount of 0.5-2.0 wt % than no functional additives were used.

<Experiment 3> Test for Cell Resistance and High-Temperature Lifetime Characteristic at High Temperature (45° C.) According to Composite Functional Additives.

To examine high-temperature lifetime characteristics according to composite functional additives used in an electrolyte, a measurement was made of discharge retention after 50 cycles at a high temperature (45° C.) while types of functional additives were changed as shown in Table 3, below. The results are summarized in Table 3 and depicted in FIG. 3.

In this regard, the other experiment conditions were the same as those in Experiment 1 and the negative electrode was made of a mixture of silicon particles and graphite.

TABLE 3

| No. | Additive | | | High temp, lifetime (%)@50 cyc |
|---|---|---|---|---|
| | VC | FEC | Bis (II) | |
| 6 | Comparative Example | — | 1.0 | — | 78.2 |
| 7 | Comparative Example | 1.0 | 1.0 | — | 79.7 |
| 8 | Example | — | 1.0 | 1.0 | 88.3 |

Compared to No. 6 where the typical functional additive (FEC) was solely used in an amount of 1.0 wt % as a second negative electrode additive, as shown in Table 3 and FIG. 3, the high-temperature lifetime was improved in both No. 7, where VC was used in combination with the second negative electrode film additive (FEC), and No. 8, where the first negative electrode film additive (Bis(II)) was used in combination with the second negative electrode film additive (FEC).

Moreover, No. 8 using the first negative electrode film additive (Bis(II)) according to the present disclosure in combination with the second negative electrode film additive (FEC) exhibited a significantly higher high-temperature lifetime than No. 7 using VC in combination with the second negative electrode film additive (FEC).

Therefore, a combination of the first negative electrode film additive (Bis(II)) according to the present disclosure and the second negative electrode film additive (FEC) was observed to further increase high-temperature lifetime characteristics.

As described hitherto, according to various forms of the present disclosure, the electrolyte can regulate the formation of SEI on the surface of a negative electrode active material to inhibit the degradation of the cell, thereby improving the lifetime of the lithium secondary battery.

Moreover, the electrolyte reduces cell resistance in the lithium secondary battery to improve output characteristics in the lithium secondary battery.

It will be appreciated by those having ordinary knowledge in the art to which the present disclosure pertains that the present disclosure may be practiced in other specific forms without changing the technical spirit and essential features of the present disclosure. Therefore, it should be understood that the above-described forms are illustrative but not restrictive in all aspects. The scope of the present disclosure is defined by the scope of the attached claims, rather than the detailed description. It should be appreciated that all variations and modifications derived from the scope of the claims and the equivalent concepts thereof are included in the scope of the present disclosure.

What is claimed is:

1. An electrolyte for a lithium secondary battery, the electrolyte comprising:
   a lithium salt; a solvent; and
   a functional additive,
   wherein the functional additive comprises 1,2-bis(maleimido)ethane, represented by the following formula 1:

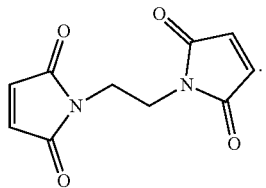

[Formula 1]

wherein the 1,2-bis(maleimido)ethane is added in an amount of 0.5 to 2.0 wt %, based on a total weight of the electrolyte,
   wherein the functional additive further comprises fluoroethylene carbonate (FEC),
   wherein the fluoroethylene carbonate (FEC) is added in an amount of 0.5 to 3.0 wt %, based on a total weight of the electrolyte.

2. The electrolyte of claim 1, wherein the lithium salt is at least one compound selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI), and $(CF_3SO_2)_2NLi$.

3. The electrolyte of claim 1, wherein the solvent is at least one substance selected from the group consisting of a carbonate-based solvent, an ester-based solvent, an ether-based solvent, and a ketone-based solvent.

4. A lithium secondary battery comprising an electrolyte, wherein the electrolyte comprises:
   a lithium salt;
   a solvent; and
   a functional additive,
   wherein the functional additive comprises 1,2-bis(maleimido)ethane, represented by the following formula 1:

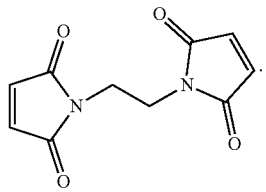

[Formula 1]

wherein the 1,2-bis(maleimido)ethane is added in an amount of 0.5 to 2.0 wt %, based on a total weight of the electrolyte,
   wherein the functional additive further comprises fluoroethylene carbonate (FEC),
   wherein the fluoroethylene carbonate (FEC) is added in an amount of 0.5 to 3.0 wt %, based on a total weight of the electrolyte.

5. The lithium secondary battery of claim 4, further comprising:
   a positive electrode containing a positive electrode active material composed of Ni, Co, or Mn;
   a negative electrode containing at least one negative electrode active material selected from a carbon (C)-based material and silicon (Si)-based material; and
   a separator interposed between the positive electrode and the negative electrode.

* * * * *